DISSTON & MORSE.
COMBINED SAW, PLUMB, AND LEVEL INDICATOR.
No. 20,337. Patented May 25, 1858.
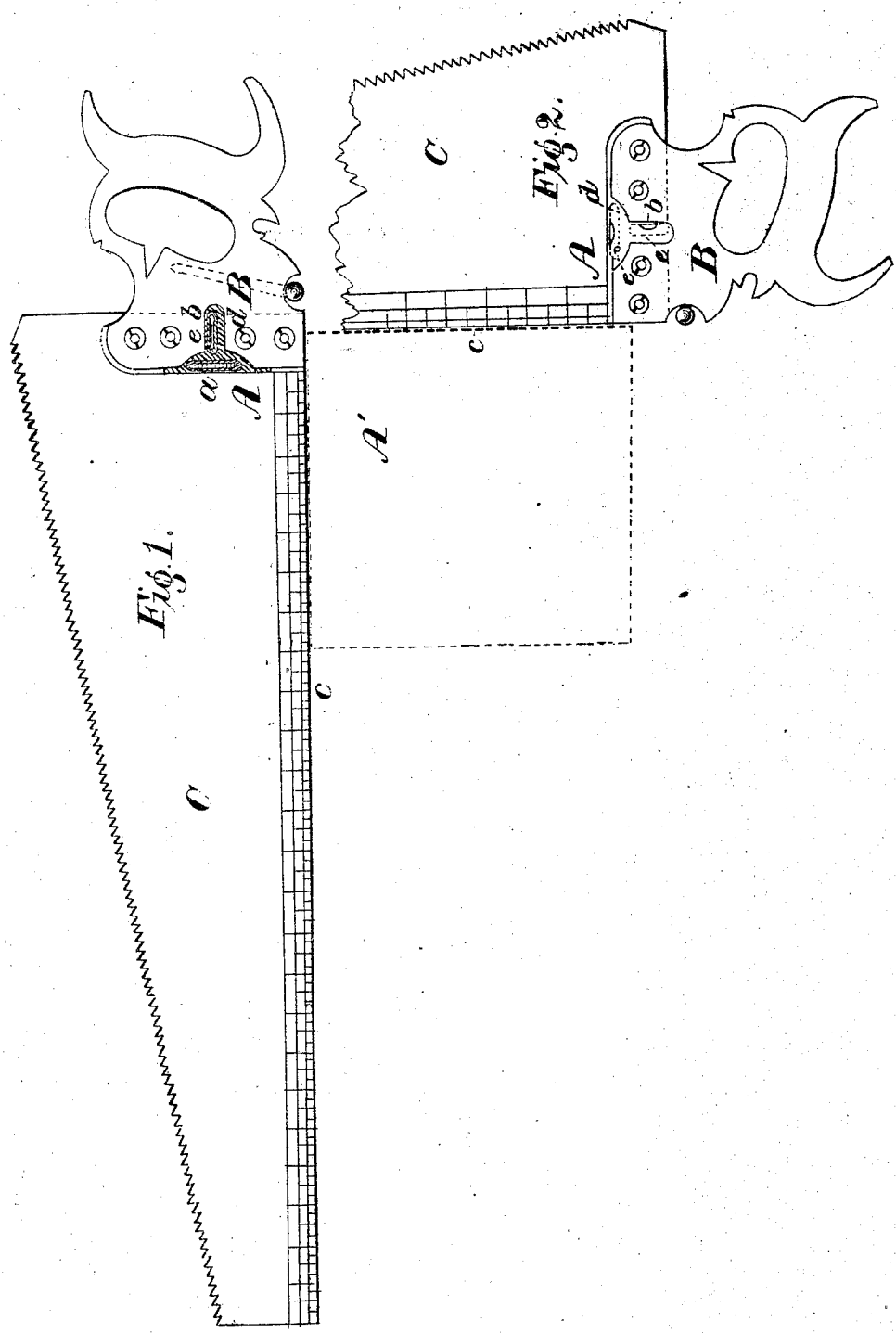

UNITED STATES PATENT OFFICE.

H. DISSTON AND T. L. MORSE, OF PHILADELPHIA, PENNSYLVANIA.

LEVELING DEVICE ATTACHED TO HAND-SAWS.

Specification of Letters Patent No. 20,337, dated May 25, 1858.

*To all whom it may concern:*

Be it known that we, HENRY DISSTON and THOMAS L. MORSE, both of Philadelphia, in the county of Philadelphia and State of Pennsylvania, have invented a new and useful Implement or Tool wherein an Ordinary Joiner's Hand-Saw is Combined with a Plumb and Level Indicator; and we do hereby declare that the following is a full, clear, and exact description of the same, reference being had to the annexed drawings, making a part of this specification, in which—

Figure 1, shows the implement used as a level. Fig. 2, shows the same used as a plumb indicator.

Similar letters of reference indicate corresponding parts in the two figures.

This invention consists in placing in one side of the handle of the saw two spirit levels at right angles with each other and in such position relatively with the back of the saw that the same may be used as a plumb and level indicator as well as a saw, and used in either capacity, equally as well as separate tools for the respective purposes.

To enable those skilled in the art to fully understand and construct our invention we will proceed to describe it.

A, represents a joiner's saw; B, is the handle C, is the blade. In one side of the handle B, two spirit bulbs or tubes $a$, $b$, are placed or fitted. These bulbs or tubes are of the usual construction, and are placed at right angles with each other, the tube $a$, being in aline at right angles with the back edge $c$, of the saw, and the tube $b$, parallel with the back edge $c$.

The spirit tubes may be fitted in the handle B, by a metal plate $d$, attached to the blade of the saw, which plate has apertures $e$, made in it at proper points to expose the air spaces of the tubes. Any proper means however may be employed to secure the tubes in the handle.

When the implement is used as a level the back edge $c$, of the saw is placed horizontally on the article A', to be leveled the tube $b'$, being the indicator, see Fig. 1. When it is used as a plumb indicator the back edge $c$, is placed vertically against the side of the article, the tube $a$, being the indicator, see Fig. 2.

The spirit tubes may be applied to an ordinary saw or to the combined saw and square recently patented by Jackson Gorham.

By combining the spirit levels with the saw as herein shown a very useful implement is obtained, especially for ordinary work as in the fitting up of portable fences and various kinds of work in which the saw is principally used in connection with a plumb and level.

We would remark that it is essential the plate $d$, be secured to the blade C, so that if the handle work loose, a contingency which frequently occurs, the relative position of the blade and levels will not be affected thereby.

Having thus described our invention what we claim as new and desire to secure by Letters Patent, is—

Placing the two spirit tubes or levels $a$, $b$, in the handle B, of the saw, relatively with each other and the back edge $c$, of the saw, substantially as and for the purpose set forth.

HENRY DISSTON.
THOMAS L. MORSE.

Witnesses:
JNO. B. KENNEY,
CHARLES THOMPSON.